US006431846B1

(12) United States Patent
Zinck

(10) Patent No.: US 6,431,846 B1
(45) Date of Patent: Aug. 13, 2002

(54) REVERSIBLE PNEUMATIC MOTOR ASSEMBLY

(76) Inventor: Frederick L. Zinck, 600 S. Elmwood Ave., Glenolden, PA (US) 19036

( * ) Notice: Subject to any disclaimer, the term of this patent is extended or adjusted under 35 U.S.C. 154(b) by 0 days.

(21) Appl. No.: 09/857,528

(22) PCT Filed: Dec. 6, 1999

(86) PCT No.: PCT/US99/28915

§ 371 (c)(1), (2), (4) Date: Aug. 21, 2001

(87) PCT Pub. No.: WO00/34627

PCT Pub. Date: Jun. 15, 2000

(51) Int. Cl.[7] .......................... F01C 13/02; F01C 21/14; F16K 31/44

(52) U.S. Cl. .................. 418/270; 137/614.11; 251/339

(58) Field of Search ..................... 418/270; 137/614.11; 251/339

(56) References Cited

U.S. PATENT DOCUMENTS

| | | | | |
|---|---|---|---|---|
| 4,344,746 A | | 8/1982 | Leonard | 418/270 |
| 4,740,144 A | * | 4/1988 | Biek | 418/270 |
| 4,772,186 A | * | 9/1988 | Pyles et al. | 418/270 |
| 4,822,264 A | * | 4/1989 | Kettner | 418/270 |
| 5,423,350 A | | 6/1995 | Zinck | 137/625.48 |

FOREIGN PATENT DOCUMENTS

| | | |
|---|---|---|
| EP | 0 844 052 A1 | 11/1997 |

* cited by examiner

*Primary Examiner*—John J. Vrablik
(74) *Attorney, Agent, or Firm*—Senniger, Powers, Leavitt & Roedel

(57) ABSTRACT

A reversible pneumatic motor assembly allows forward, reversing and throttling of a pneumatic motor by manipulation of a single lever with one hand. A reversing valve assembly of the motor assembly includes a tilt valve disposed in an inlet passage having a valve seat for receiving the valve to block the inlet passage. Forward and reverse passages extend from the valve assembly to the motor for driving the motor in forward and reverse directions. A shuttle connected to the lever can be moved transversely of the motor assembly. The shuttle and tilt valve are mounted for movement upon actuation of the actuator between a first position in which the tilt valve is tilted about an axis off of the valve seat and the shuttle is disposed to form a continuous air flow path from the inlet passage, through the shuttle and into the forward passage for driving the motor in the forward direction, a second position in which the tilt valve is tilted about the axis off of the valve seat and the shuttle is disposed to form a continuous air flow path from the inlet passage, through the shuttle and into the reverse passage for driving the motor in the reverse direction, and a third position in which the tilt valve seats on the valve seat to prevent flow of air from the inlet passage to the motor.

11 Claims, 6 Drawing Sheets

REVERSIBLE PNEUMATIC MOTOR ASSEMBLY

BACKGROUND OF THE INVENTION

This invention relates generally to pneumatically operated motors and more specifically to a pneumatic motor assembly having throttling and reversing features.

The present invention is an improvement on my prior air motor reversing throttle shown and described in U.S. Pat. No. 5,423,350, the disclosure of which is incorporated herein by reference. My prior invention conveniently provides for throttling and forward and reverse operation of a pneumatic motor by simple pivoting movement of a single lever (31). Throttling and direction of movement can be actuated with one hand and can also entirely stop the motor. Pivoting movement of the lever in a first direction about an axis moves a valve (22) in a valve guide bore (12) in a housing to bring one of two valve passages (23 or 29) into registration with one of the corresponding passages (18 and 30 or 19 and 32) formed in the housing to drive the air motor in a counterclockwise or clockwise direction. In a middle or stop position of the valve, neither valve passage overlies either of the corresponding passages so there is no fluid communication through the valve to the motor. In addition, the lever can be moved to vary the amount of the passage (23 or 29) which overlaps the corresponding passage (30 or 32) the motor can be throttled to run at different speeds solely by manipulation of the lever.

The flow of air to the valve (22) is controlled by a plunger (21) which is spring biased to seat against a valve seat to block an air inlet passage from communicating with the valve. In order to move the plunger off of its seat to permit air to flow to the valve, a stem of the plunger is received in a V-shaped notch on one side of the plunger. As the valve slides transversely the notch moves relative to the stem so that the end of the stem is pushed rectilinearly (or "perpendicularly") to unseat the plunger and permit air to flow to the valve. The V-shape of the notch provides the same axial movement of the plunger for movement of the valve in either direction. Although my prior air motor reversing throttle works well and provides many conveniences for the operator, improvements can be made. It has been found that the interaction between the V-shaped notch and the plunger stem is such that return of the valve to the stop position is inhibited. Sometimes the force of the spring on the plunger is insufficient to move the valve and plunger to stop the motor when the lever is released. Moreover, the axial movement of the plunger can sometimes be difficult to achieve, requiring substantial force to be applied to the lever. The application of this force necessary to move the plunger off its seat can make it difficult to control the throttle with the lever.

SUMMARY OF THE INVENTION

Among the several objects and features of the present invention may be noted the provision of a pneumatic reversing motor assembly which can be actuated to start and run in forward and reverse directions by manipulation of a single lever; the provision of such motor assembly which can be throttled with the same lever; the provision of such a motor assembly which can be started and run in forward and reverse directions with minimal application of manual force to the lever; the provision of such a motor assembly which consistently returns to a stop position when manual force is released; the provision of such a motor assembly which is easy to use and economical to manufacture.

Generally, a reversible pneumatic motor assembly comprises a housing and a reversible motor in the housing. The housing includes an inlet connection for connecting the motor assembly to a source of pressurized air, an inlet passage extending inwardly into the housing from the inlet connection, a forward passage adapted for communicating with the inlet passage for delivering air to the motor for driving the motor in a forward direction and a reverse passage adapted for communicating with the inlet passage for delivering air to the motor for driving the motor in a reverse direction. A reversing valve assembly disposed in the housing between the inlet passage and the forward and reverse passages is capable of selectively controlling fluid communication between the inlet passage and the reversible motor by operation of an actuator mounted on the housing to selectively drive the motor in the forward and reverse directions. The reversing valve assembly comprises a tilt valve disposed in the inlet passage and receivable on a valve seat in the inlet passage to block the inlet passage. A spring biases the valve against the valve seat. A shuttle is located in the housing and connected to the actuator for transverse sliding motion in the housing. The shuttle and valve are mounted in the housing for movement upon actuation of the actuator between a first position in which the valve is tilted about an axis off of the valve seat and the shuttle is disposed to form a continuous air flow path from the inlet passage, through the shuttle and into the forward passage for driving the motor in the forward direction, a second position in which the valve is tilted about the axis off of the valve seat and the shuttle is disposed to form a continuous air flow path from the inlet passage, through the shuttle and into the reverse passage for driving the motor in the reverse direction, and a third position in which the valve seats on the valve seat to prevent flow of air from the inlet passage to the motor.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
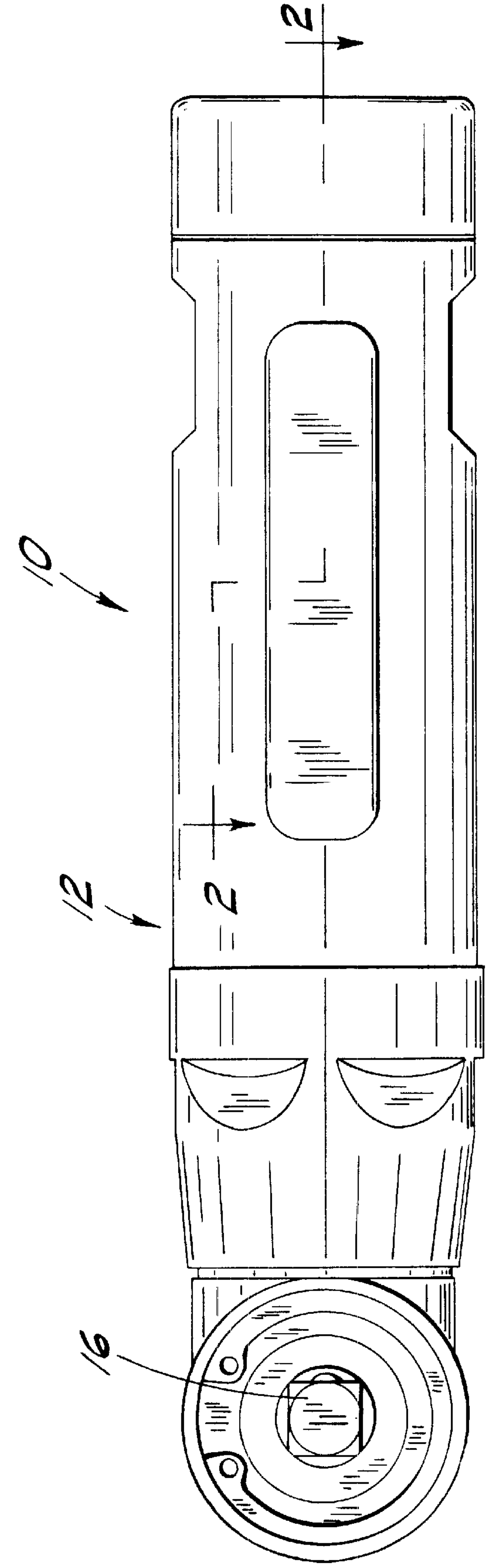
FIG. 1 is a front view of a pneumatic tool of the present invention.
Figure 2:
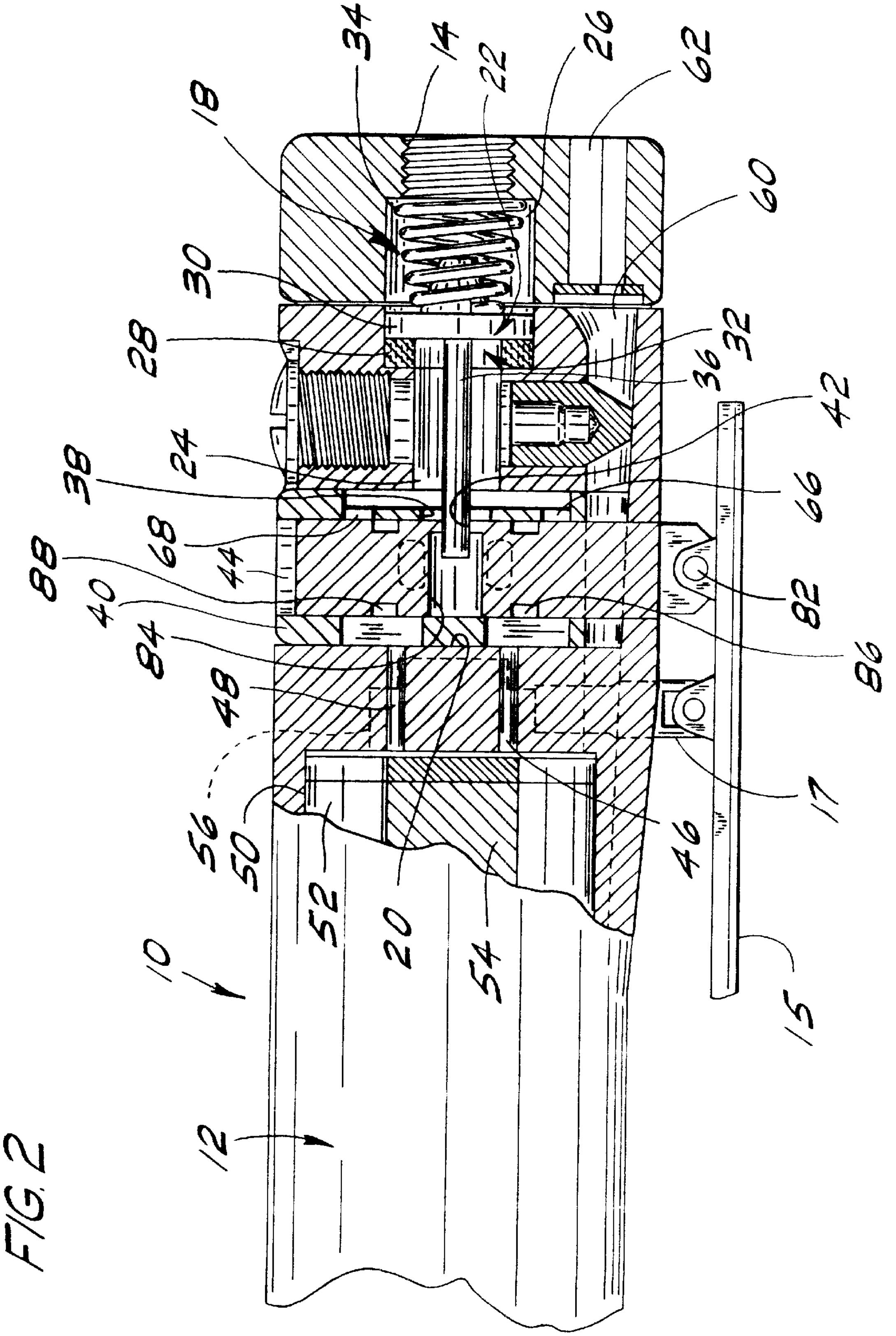
FIG. 2 is a fragmentary, longitudinal sectional view of the tool taken along line 2—2 of FIG. 1.
Figure 3:
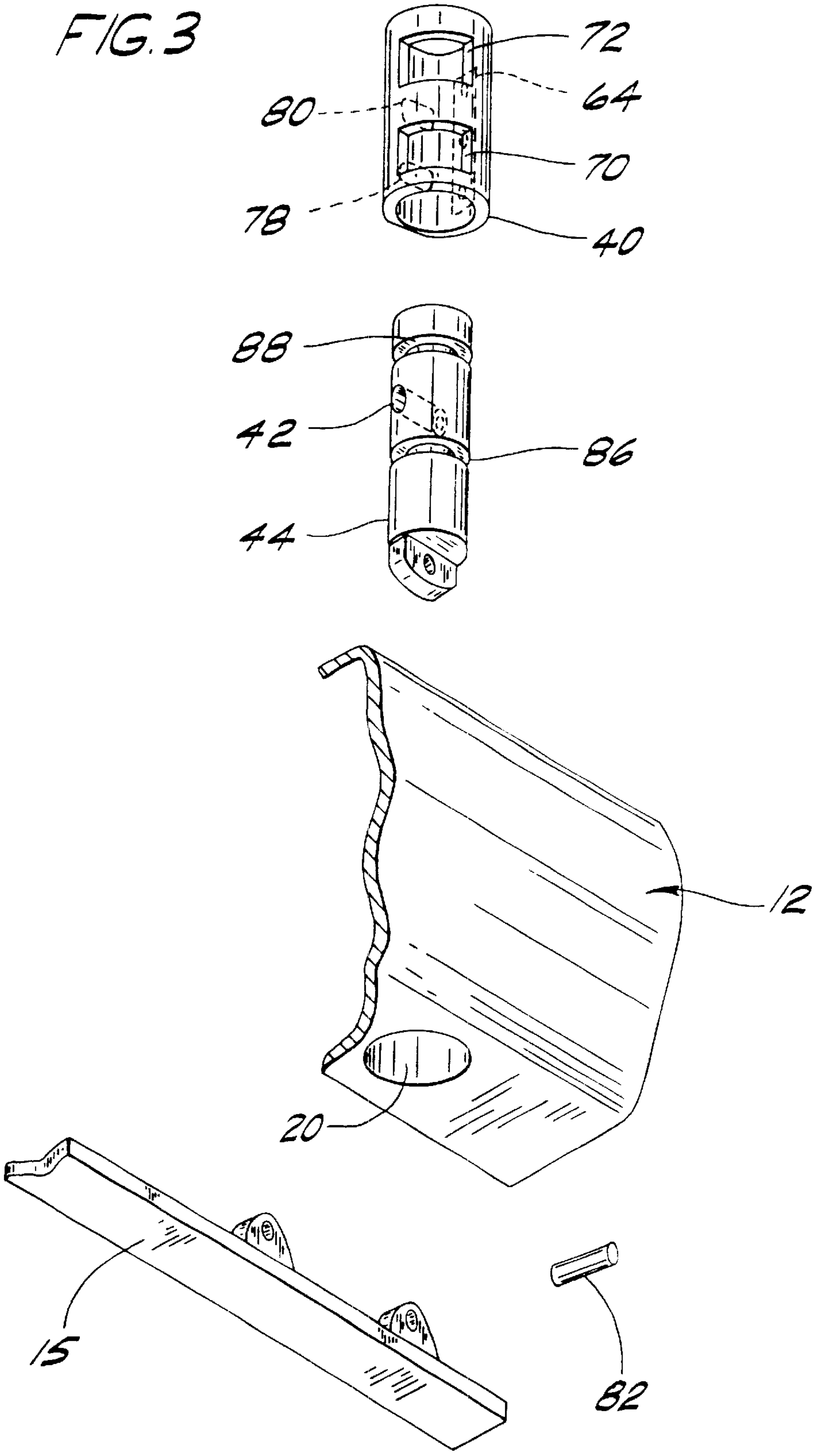
FIG. 3 is a fragmentary perspective view of the tool with a valve assembly of the tool partially exploded from a housing thereof.

Referring now to the drawings, and in particular to FIGS. 1 and 2, a pneumatic tool constructed according to the principles of the present invention is indicated generally at 10. The tool includes a housing, generally indicated at 12, having an air inlet connection 14 at one end and an implement 16 located at an opposite end for driving an object such as a bolt (not shown) in rotation. The housing 12 is elongate and generally cylindrical for gripping in one hand. A lever 15 is pivotally mounted on the housing by connection to a mounting stud 17 fixed in the housing 12 for starting, stopping, throttling and reversing direction of the tool 10, as will be described hereinafter. The particular tool shown is a ratchet wrench described in my prior provisional application Ser. No. 60/109,429, filed Nov. 23, 1998 and my co-pending PCT application filed Nov. 23, 1999, the disclosure of which is incorporated herein by reference. Although the pneumatic hand tool 10 is shown, the present invention has broader application to reversing pneumatic motor assemblies without regard to whether the motor assembly is driving a hand tool or, indeed, a tool of any kind. More broadly, the present invention pertains to a reversible pneumatic motor assembly without regard to the specific application of the motor assembly. However, for purposes of this description, the invention will be described in the context of a preferred embodiment of a hand tool 10.

Referring to FIG. 2, the inlet connection 14 is constructed for connecting the tool 10 to a source of compressed air (not shown), which may be a conventional air compressor and compressed air storage unit. An inlet passage, generally indicated at 18, extends inwardly from the inlet connection into the housing 12 to a transverse hole 20 in the housing which receives portions of a reversing valve assembly (generally indicated at 22). An axially inner portion 24 of the inlet passage 18 has a smaller diameter than an axially outer portion 26 of the inlet passage so that a shoulder is formed. A ring located at the shoulder defines a valve seat 28 engageable with a valve body 30 of a valve (generally indicated at 32) to normally block fluid communication between the inner and outer portions 24, 26 of the inlet passage 18 when the tool 10 is stopped. The valve 32 further includes a coil spring 34 engaging at one end the housing 12 on the interior of the inlet passage 18 and engaging the valve body 30 at the opposite end to bias the valve body against the valve seat 28. A stem 36 extends from the valve body 30 through the inner portion 24 of the inlet passage and an oval center hole 38 in a bushing 40, into an opening 42 in a shuttle 44 received in the bushing for sliding within the bushing generally transversely of the housing 12. In the illustrated embodiment, the valve 32, the bushing 40 and the shuttle 44 are parts of the reversing valve assembly 22.

The section line for FIG. 2 (shown in FIG. 1) has a jog so that forward and reverse passages (designated 46 and 48, respectively) may be seen which would otherwise be removed in a straight longitudinal section of the tool 10. The forward and reverse passages 46, 48 extend from the transverse hole 20 in the housing 12 to an air motor 50 of the tool 10. The inlet passage 18, forward passage 46 and reverse passage 48 are formed into the housing 12 in the illustrated embodiment. However, these passages could be separately constituted (such as by pipes or tubes) from the housing without departing from the scope of the present invention. The air motor 50 includes a cylindrical, hollow casing 52 and a rotary vane 54 located within the casing. The rotary vane 54 has shafts (not shown) which extend through respective ends of the casing and are mounted in bearings 56 (one of which is shown in hidden lines) for rotation of the rotary vane in the casing. The forward and reverse passages 46, 48 extend through the casing to delivery of pressurized air to the rotary vane. Delivery of air through the forward passage 46 results in a forward (e.g., clockwise) rotation of the implement 16 of the tool 10, and delivery of air through the reverse passage 48 results in a reverse (e.g., counterclockwise) rotation of the implement. Exhaust air from the motor 50 may exit the casing through vents (not shown) in the casing and into an exhaust passage 60 formed in the housing 12. These vents are conventional in construction and arrangement and will not be further described herein. The exhaust passage 60 extends to an exhaust exit 62 at the same end of the tool 10 where the inlet connection 14 is located. In addition, exhaust air can be passed through whichever of the forward and reverse passages 46, 48 which is not being used to deliver high pressure air to the motor 50 through the valve assembly 22 to the exhaust passage 60, as will be described hereinafter.

Figure 4C:
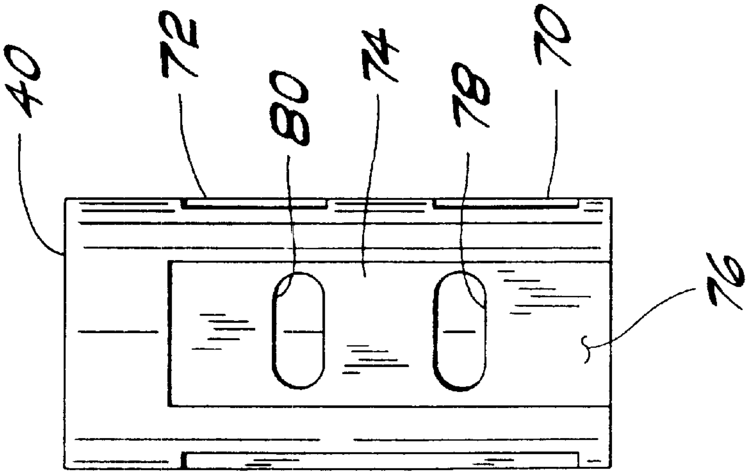
FIG. 4C is a rear elevational view of the bushing.
Figure 4B:
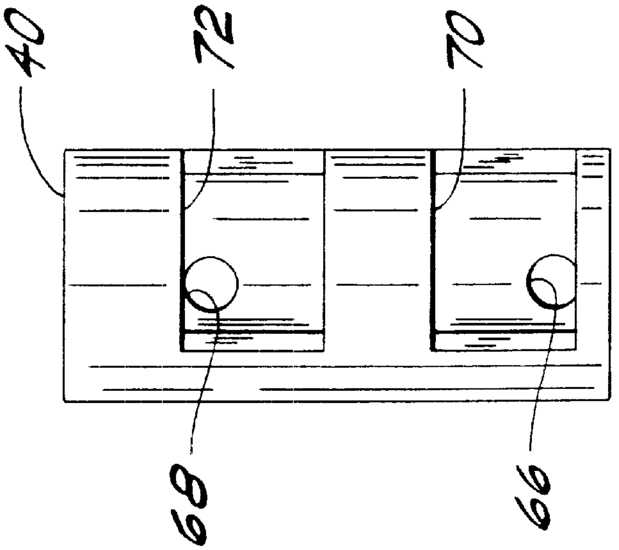
FIG. 4B is a front elevational view of the bushing.
Figure 4A:
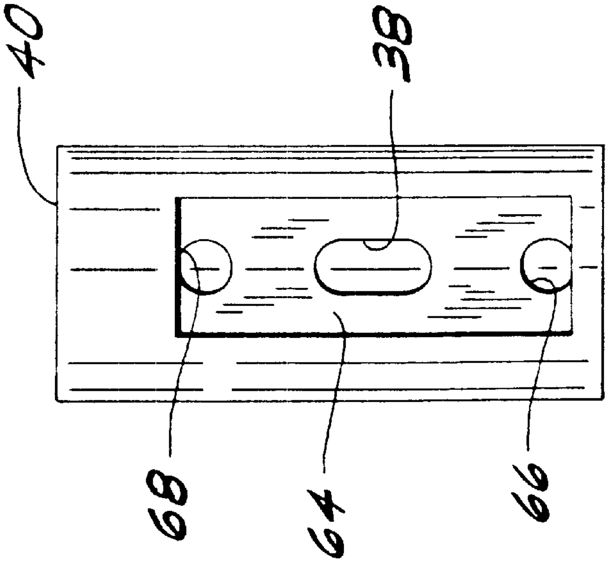
FIG. 4A is a right side elevational view of a bushing of the valve assembly.

The bushing 40 of the valve assembly 22 is tubular in shape is formed with a rectangular, recessed flat 64 on an inlet side of the bushing (see FIG. 4A). Axially spaced first and second inlet ports (designated at 66 and 68, respectively) located in the recess flat 64 extend through the bushing 40 into its hollow interior and also open into the inner portion 24 of the inlet passage 18 so that they are permanently in fluid communication with the inlet passage. The center hole 38 in the bushing 40 which receives the stem 36 of the valve 32 is located within the recessed flat 64 between the inlet ports. Relatively large first and second windows (designated 70 and 72, respectively) are located generally in the front side of the bushing 40 (see FIG. 4B). The forward passage 46 in the housing 12 opens into the first window 70 and the reverse passage 48 opens into the second window 72 such that the forward passage is permanently in fluid communication with the first window and the reverse passage is permanently in fluid communication with the second window. The bushing 40 has a flat 74 on its back side (see FIG. 4C) causing the bushing 40 to be spaced from the transverse hole 20 in the housing 12 to define a transversely extending exhaust feed passage 76 communicating with the exhaust passage 60. A first exhaust port 78 and a second exhaust port 80 in the bushing 40 place the interior of the bushing in permanent fluid communication with the exhaust feed passage 76. The shuttle 44 within the interior of the bushing 40 controls which of the inlet ports (66 or 68) and exhaust ports (78 or 80) are operable to pass air, as will be described hereinafter.

The shuttle 44 is cylindrical in shape and is received in the interior of the bushing 40. The shuttle 44 extends out of the bushing and transverse hole 20 in the housing 12 where it is pivotally connected by a pin 82 to the lever 15 at a location spaced from the pivotal connection of the lever to the housing (FIG. 2). The shuttle 44 extends through the exhaust passage 60, and the exhaust passage is formed around the shuttle so that it is not blocked by the shuttle. Pivoting the lever 15 in a clockwise direction on the mounting pin 17 pulls the shuffle 44 down (as the tool 10 is oriented in FIG. 5) to a first position for forward operation of the tool 10, and pivoting the lever in a counterclockwise direction pushes the shuttle up to a second position (FIG. 6) for reverse operation. The opening 42 which receives the stem 36 of the valve 32 is aligned with the center hole 38 of the bushing 40 and the stem passes through the center hole into the shuttle opening. The entry of the opening 42 is formed in size close to that of the diameter of the stem 36 so that the stem is substantially sealed in the opening and is moved transverse to the housing by transverse movement of the shuttle 44. Inwardly of the opening entry, the opening 42 has a counterbore 84 of larger diameter than the entry. The counterbore 84 provides space within the shuttle 44 for the distal end portion of the stem 36 to move within the shuttle (see FIGS. 5 and 6). Movement of the shuttle 44 to either the first position (FIG. 5) or the second position (FIG. 6) causes the valve 32 to tilt so that a portion of the valve body 30 moves out of engagement with the valve seat 28 allowing pressurized air to pass around the valve body into the inner portion 24 of the inlet passage 18 to the bushing 40 and shuttle. Movement of the shuttle 44 toward the first position pivots the valve 32 in a counterclockwise direction about an axis transverse to the housing 12 and movement of the shuttle toward the second position pivots the valve in a clockwise direction about the axis. The shuttle 44 further includes a first circumferential channel 86 and an axially spaced second circumferential channel 88 which allow passage of air through the shuttle within the interior of the bushing 40, as will be described.

Having set forth the construction of the pneumatic tool 10 of the present invention, its operation will be described. When not in use, the valve assembly 22 is in a third or neutral position, as shown in FIG. 2, in which the tool 10 is stopped. In this position, the first and second circumferential channels 86, 88 are out of alignment with the first and second inlet ports 66, 68 in the bushing 40. Thus, the shuttle 44 blocks both the inlet ports. In addition, the stem 36 of the valve 32 is located generally parallel to the axis of the housing 12 and the valve body 30 is fully seated against the valve seat 28 blocking passage of air from the outer portion 26 to the inner portion 24 of the inlet passage 18. The coil spring 34 biases the valve assembly 22 to this position so that whenever manual force on the lever 15 is released, the valve assembly moves automatically to the neutral position. The distal end of the stem 36 is free of engagement with the shuttle 44 so that the stem does not bind on the shuttle, but is allowed to pivot within the shuttle.

Figure 5:
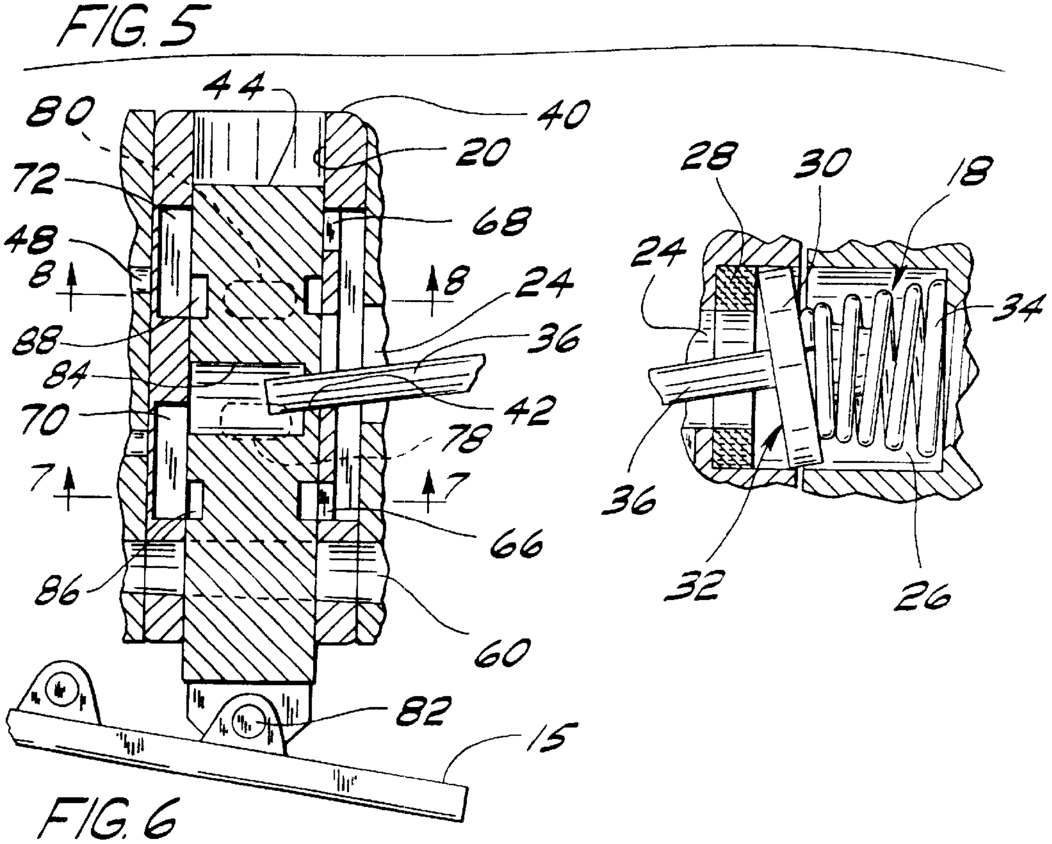
FIG. 5 is an enlarged, fragmentary, longitudinal section taken from FIG. 2 and showing the valve assembly in a forward operating position.
Figure 6:
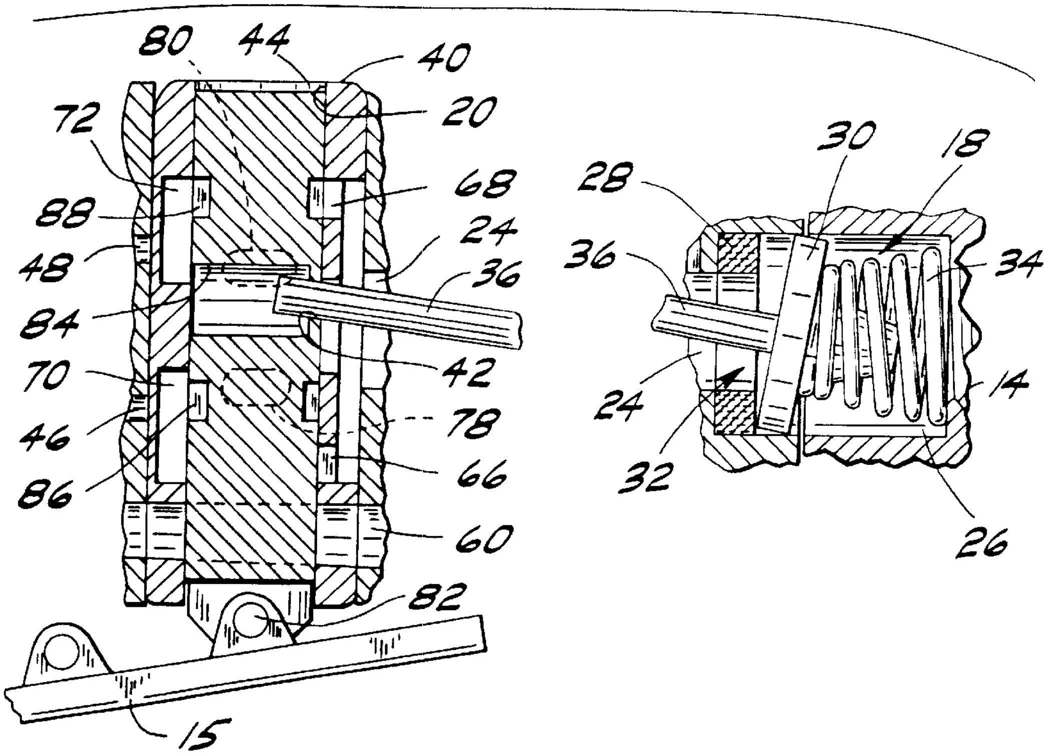
FIG. 6 is the enlarge section of FIG. 5 but showing the valve assembly in a reverse operating position.
Figure 7:
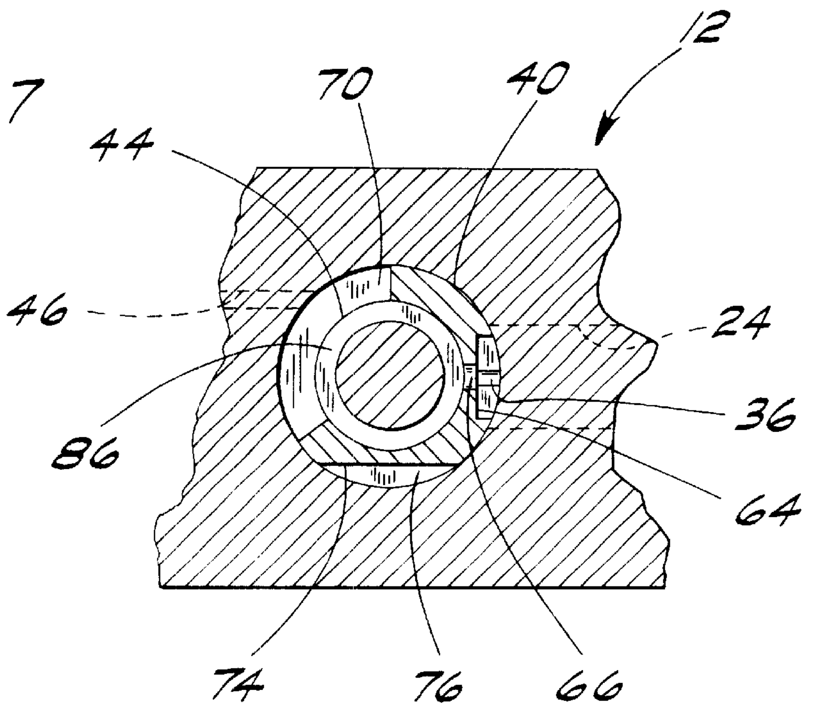
FIG. 7 is a section taken in the plane including line 7—7 of FIG. 5.
Figure 8:
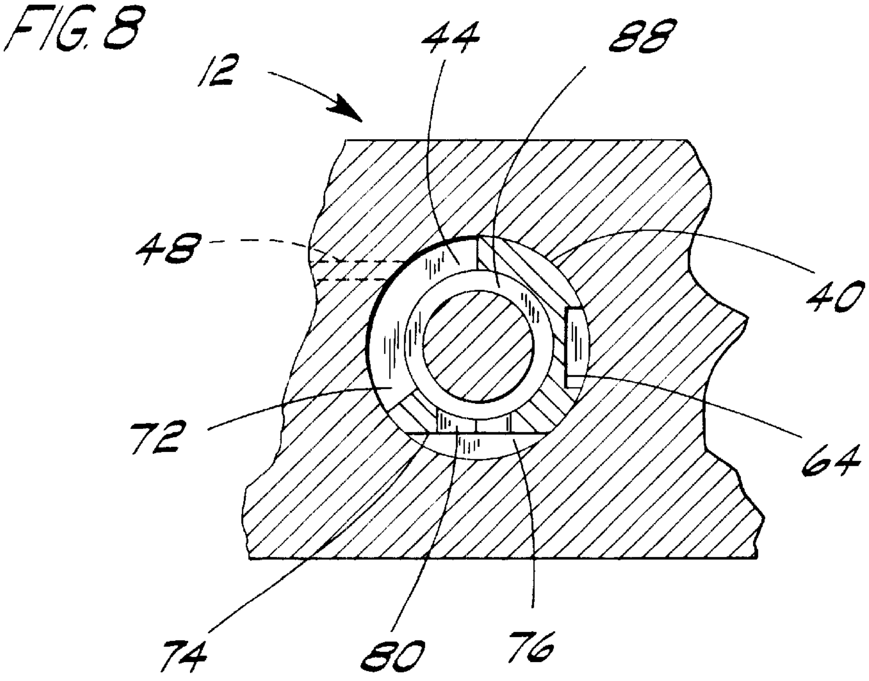
FIG. 8 is a section taken in the plane including line 8—8 of FIG. 5.

Pivoting the lever 15 in a clockwise direction to the first position, as shown in FIG. 5, tilts the valve body 30 off of the seat so that pressurized air passes into the inner portion 24 of the inlet passage 18. In the first position, the first circumferential channel 86 of the shuttle 44 is in registration with the inlet port in the bushing 40. The first channel 86 is always in registration with the first window 70 in the bushing 40 so that in the first position the air may pass into the bushing through the first inlet port 66, around the shuttle 44 in the first channel, and out of the bushing through the first window into the forward passage 46, as illustrated in FIG. 7. Thus in the first position, there is a continuous path from the first inlet port 66 to the forward passage 46. Throttling may be achieved by moving the lever 15 to vary the amount of the first channel 86 overlying the first inlet port 66. In this way, the operator can control the speed of the motor 50 with the lever 15. The first channel 86 is out of registration with the first exhaust port 78 so that it is blocked by the shuttle 44. In the first position, the second channel 88 of the shuttle 44 is out of registration with the second inlet port 68 and the port is blocked by the shuttle so that pressurized air cannot pass through the shuttle to the reverse passage 48. However, the second channel 88 is in registration with the second exhaust port 80 (shown in hidden lines in FIG. 5) and the second window 72 in the first position of the shuttle 44. Thus, exhaust air may pass along a continuous path from the motor 50 through the reverse passage 48, into the second window 72, around the shuttle 44 in the second channel 88 and out the second exhaust port 80 to the exhaust feed passage 76 (FIG. 8). The exhaust feed passage delivers the exhaust air laterally through the housing 12 to the exhaust passage 60.

Pivoting the lever 15 in a counterclockwise direction moves the shuttle 44 to the second position. The tilt valve 32 is pivoted in a clockwise direction to bring the valve body 30 off of the seat so that pressurized air again passes into the inner portion 24 of the inlet passage 18. In the second position, shown in FIG. 6, the first circumferential channel 86 in the shuttle 44 is out of registration with the first inlet port 66 so that the first inlet port is blocked by the shuttle. However, the second circumferential channel 88 is in registration with the second inlet port 68 and the second window 72 so that pressurized air flows through the second inlet port, around the shuttle 44 in the second channel and out the second window in to the reverse passage 48 for driving the motor 50 in a reverse direction. The second channel 88 is out of registration with the second exhaust port 80 which is blocked by the shuttle 44 from passing air from the interior of the bushing 40 to the exhaust feed passage 76. The first channel 86 is aligned with the first exhaust port 78 and the first window 70 so that exhaust air from the motor 50 may flow through the first window, around the shuttle 44 in the first channel and out of the valve assembly 22 through the first exhaust port into the exhaust feed passage 76. In this way reverse operation of the motor 50 is achieved.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A reversible pneumatic motor assembly comprising:

a housing including an inlet connection for connecting the motor assembly to a source of pressurized air, and an inlet passage extending inwardly into the housing from the inlet connection;

a reversible motor in the housing, the housing further including a forward passage adapted for communicating with the inlet passage for delivering air to the motor for driving the motor in a forward direction and a reverse passage adapted for communicating with the inlet passage for delivering air to the motor for driving the motor in a reverse direction;

a reversing valve assembly disposed in the housing between the inlet passage and the forward and reverse passages for selectively controlling fluid communication between the inlet passage and the reversible motor;

an actuator mounted on the housing for actuating the valve assembly to selectively drive the motor in the forward and reverse directions;

the reversing valve assembly comprising a tilt valve disposed in the inlet passage, the inlet passage having a valve seat for receiving the tilt valve to block the inlet passage, a spring for biasing the tilt valve against the valve seat, a shuttle located in the housing and connected to the actuator for transverse sliding motion in the housing;

the shuttle and tilt valve being mounted in the housing for movement upon actuation of the actuator between a first position in which the tilt valve is tilted about an axis off of the valve seat and the shuttle is disposed to form a continuous air flow path from the inlet passage, through the shuttle and into the forward passage for driving the motor in the forward direction, a second position in which the tilt valve is tilted about the axis off of the valve seat and the shuttle is disposed to form a continuous air flow path from the inlet passage, through the shuttle and into the reverse passage for driving the motor in the reverse direction, and a third position in which the tilt valve seats on the valve seat to prevent flow of air from the inlet passage to the motor.

2. A reversible pneumatic motor assembly as set forth in claim 1 wherein the actuator comprises a lever mounted on the housing for pivoting motion about an axis such that pivoting in a first direction moves the shuttle to the first position for forward operation of the motor, and pivoting the actuator in a second direction opposite the first direction moves the shuttle to the second position for reverse operation of the motor.

3. A reversible pneumatic motor assembly as set forth in claim 1 further comprising an implement mounted on the housing at an end generally opposite an end where the inlet connection is located for use in imparting a rotary motion to an object.

4. A reversible pneumatic motor assembly as set forth in claim 1 wherein the shuttle and tilt valve are operatively connected such that transverse sliding motion of the shuttle between the first and second positions tilts the tilt valve about the axis.

5. A reversible pneumatic motor assembly as set forth in claim 4 wherein the tilt valve includes a valve stem extending from the tilt valve and received in the shuttle.

6. A reversible pneumatic motor assembly as set forth in claim 5 wherein the shuttle has an opening for receiving an distal end portion of the tilt valve stem therein, the tilt valve stem being in closely spaced relation with the shuttle in the opening.

7. A reversible pneumatic motor assembly as set forth in claim 6 wherein a distal, axially facing end of the tilt valve stem is free of contact with the shuttle.

8. A reversible pneumatic motor assembly as set forth in claim 7 wherein the opening is counterbored to a diameter substantially greater than the diameter of the stem such that the distal end portion of the stem can move relative to the shuttle within the shuttle.

9. A reversible pneumatic motor assembly as set forth in claim 8 wherein the valve assembly further comprises a bushing in the housing receiving the shuttle for movement between said first and second positions.

10. A reversible pneumatic motor assembly as set forth in claim 9 wherein the shuttle is generally cylindrical in shape and has first and second axially spaced circumferential channels formed therein for passing air through the shuttle, the bushing being tubular in shape and having first and second axially spaced inlet ports in fluid communication with the inlet passage, a first window therein in communication with the forward passage and a second window therein in communication with the reverse passage, in the first position of the shuttle the first circumferential channel of the shuttle being in fluid communication with the first inlet port and the first window for passage of air from the inlet passage to the forward passage, the shuttle blocking the second inlet port in the first position, in the second position of the shuttle the second circumferential channel being in fluid communication with the second inlet port and the second window for passage of air from the inlet passage to the reverse passage.

11. A reversible pneumatic motor assembly as set forth in claim 10 wherein the housing further comprises an exhaust passage therein for receiving exhaust air from the motor and delivering the exhaust air to a location outside the housing, and wherein bushing further includes first and second exhaust ports in fluid communication with the exhaust passage, in the first position of the shuttle the second circumferential channel of the shuttle being in fluid communication with the second window and the second exhaust port to form a continuous exhaust path from the reverse passage to the exhaust passage, the shuttle blocking the first exhaust port in the first position, in the second position of the shuttle the first circumferential channel of the shuttle being in fluid communication with the first window and the first exhaust port to form a continuous exhaust path from the forward passage to the exhaust passage, the shuttle blocking the second exhaust port in the second position.

* * * * *